US012747332B2

(12) United States Patent
Kim et al.

(10) Patent No.: US 12,747,332 B2
(45) Date of Patent: Sep. 29, 2026

(54) WASTE PLASTIC RECYCLING PROCESS

(71) Applicant: LG Chem, Ltd., Seoul (KR)

(72) Inventors: Gyoungsik Kim, Daejeon (KR); Seog Jae Seo, Daejeon (KR); Gyeongho Seon, Daejeon (KR); Chang Hwan Ju, Daejeon (KR); Danbi Han, Daejeon (KR); Jae Hoon Hoon Choe, Daejeon (KR)

(73) Assignee: LG Chem, Ltd., Seoul (KR)

( * ) Notice: Subject to any disclaimer, the term of this patent is extended or adjusted under 35 U.S.C. 154(b) by 754 days.

(21) Appl. No.: 18/030,792

(22) PCT Filed: Jun. 21, 2022

(86) PCT No.: PCT/KR2022/008789
§ 371 (c)(1),
(2) Date: Apr. 7, 2023

(87) PCT Pub. No.: WO2022/270871
PCT Pub. Date: Dec. 29, 2022

(65) Prior Publication Data

US 2023/0374248 A1 Nov. 23, 2023

(30) Foreign Application Priority Data

Jun. 22, 2021 (KR) ........................ 10-2021-0080482

(51) Int. Cl.
*C08J 11/08* (2006.01)

(52) U.S. Cl.
CPC ............ *C08J 11/08* (2013.01); *C08J 2369/00* (2013.01)

(58) Field of Classification Search
USPC ............................................................ 521/40
See application file for complete search history.

(56) References Cited

U.S. PATENT DOCUMENTS

| | | | |
|---|---|---|---|
| 3,264,262 A | 8/1966 | Baker et al. | |
| 6,306,222 B1 | 10/2001 | Kim et al. | |
| 2007/0299150 A1 | 12/2007 | Nakao et al. | |
| 2019/0322832 A1 | 10/2019 | Chen et al. | |

FOREIGN PATENT DOCUMENTS

| | | | |
|---|---|---|---|
| JP | H11152371 A | 6/1999 | |
| JP | 3027155 B1 | 3/2000 | |
| JP | 2005255550 A | 9/2005 | |
| JP | 2005255963 A | 9/2005 | |
| JP | 4013576 B2 | 11/2007 | |
| JP | 2020-056005 A | 4/2020 | |
| KR | 100341017 B1 | 6/2002 | |
| KR | 20050036847 A | 4/2005 | |
| KR | 100601734 B1 | 7/2006 | |
| KR | 101561528 B1 | 10/2015 | |
| KR | 20160064872 A | 6/2016 | |
| KR | 102192506 B1 | 12/2020 | |
| KR | 20210067555 A * | 6/2021 | ............. B29B 17/02 |
| WO | 2020097413 A1 | 5/2020 | |

OTHER PUBLICATIONS

KR-20210067555-A Machine Translation (Year: 2021).*
Extended European Search Report including Written Opinion for Application No. 22828718.1 dated Jan. 30, 2024, pp. 1-13.
Abbott, S. "Hansen Solubility Parameters (HSP)" Practical Adhesion Science, https:/Avww.stevenabbott.co.uk/practical-adhesion/hsp.php, Jan. 2024, pp. 1-10.
Kjellander, C. K. et al., "ESC resistance of commercial grade polycarbonates during exposure to butter and related chemicals" Polymer Degradation and Stability,Contents lists available at ScienceDirect, Elsevier Ltd, Aug. 2008, pp. 1486-1495, vol. 93.
Hansen, C.M. "Hansen solubility parameter" Hansen solubility parameter—Wikipedia, Jan. 2024, pp. 1-4.
International Search Report for Application No. PCT/KR2022/008789 mailed Oct. 12, 2022. 3 pgs.
Yong Hyun Shin et al., Effects of Solubility Parameter of Solvents in Solvent-induced Crystallization of Polycarbonate, Polym. Korea, vol. 45, No. 3, pp. 476-480. [English translation attached].

* cited by examiner

*Primary Examiner* — Terressa Boykin
(74) *Attorney, Agent, or Firm* — Lerner David LLP

(57) ABSTRACT

A waste plastic recycling process includes preparing a first solution by dissolving waste plastics in an organic solvent; adding an adsorbent to the first solution; recrystallizing plastics by adding 60 parts by weight or more of a compound having a Hansen solubility parameter (HSP) of 5 to 14 with respect to polycarbonate based on 100 parts by weight of the total weight of the first solution; and collecting the recrystallized plastics. A method for preparing recyclable plastics thereof is also provided.

17 Claims, No Drawings

WASTE PLASTIC RECYCLING PROCESS

CROSS-REFERENCE TO RELATED APPLICATIONS

The present application is a national phase entry under 35 U.S.C. § 371 of International Application No. PCT/KR2022/008789 filed on Jun. 21, 2022, which claims priority from Korean Patent Application No. 10-2021-0080482 filed on Jun. 22, 2021, all disclosures of which are incorporated herein by reference.

TECHNICAL FIELD

The present invention relates to a waste plastic recycling process, and more particularly, to a chemical recycling process of waste plastics using recrystallization and adsorption purification.

BACKGROUND ART

Since plastics are readily processed and their physical and chemical properties are easily changed, plastics are widely used in modern society. Although landfill and incineration methods are frequently used to process waste plastic discarded after use, it is difficult to naturally decompose plastics, so that when landfilled, plastics may cause environmental problems such as water and soil pollution and may cause environmental problems such as air pollution when incinerated.

In order to solve such environmental problems, many studies have been conducted to process, purify, transform and recycle waste plastics, and some of the recycling methods have been put to practical use. However, since there is a disadvantage in that the unit cost of plastics recycled by the recycling method is high and the purity of the plastics cannot be significantly improved, the recycled plastic cannot be used in many applications. Further, it is difficult to process and purify recycled plastics because waste plastics with various colors are mixed, so that there is a disadvantage in that it is difficult to specify the desired physical and chemical properties and to implement colors.

Therefore, there is a continuous need for research on a recycling process of waste plastics, which is capable of implementing a desired color while significantly increasing the purity of recycled plastics.

Technical Problem

The present invention has been made in an effort to solve the problems of waste plastic recycling processes in the related art, and to provide a waste plastic recycling process capable of significantly increasing the purity of recycled plastics using a chemical purification method.

Technical Solution

An exemplary embodiment of the present invention provides a recycling process of waste plastics, including:

preparing a first solution by dissolving waste plastics in an organic solvent;

adding an adsorbent to the first solution;

recrystallizing plastics by adding 60 parts by weight or more of a compound having a Hansen solubility parameter (HSP) of 5 to 14 with respect to polycarbonate based on 100 parts by weight of the total weight of the first solution; and collecting the recrystallized plastics.

Another exemplary embodiment of the present invention provides a method for preparing recyclable plastics, the method including a recycling process of the waste plastics.

Advantageous Effects

The waste plastic recycling process of the present invention can significantly increase the purity of recycled plastics using a chemical purification method using recrystallization and an adsorbent. Further, colorless recycled plastics can be obtained.

In addition, according to the waste plastic recycling process of the present invention, by reducing the number of times of adding an organic solvent to one, it is possible to have the effect of shortening the process time compared to the existing method of adding the organic solvent two times.

Furthermore, according to the waste plastic recycling process of the present invention, optimal adsorption conditions can be set by diversifying the type of adsorbent introduced and adjusting the content, so that it is possible to effectively remove impurities which waste plastics have while maintaining the properties inherent to existing polycarbonates.

DETAILED DESCRIPTION

Hereinafter, specific exemplary embodiments will be described in more detail.

An exemplary embodiment of the present invention provides a recycling process of waste plastics, including:

preparing a first solution by dissolving waste plastics in an organic solvent;

adding an adsorbent to the first solution;

recrystallizing plastics by adding 60 parts by weight or more of a compound having a Hansen solubility parameter (HSP) of 5 to 14 with respect to polycarbonate based on 100 parts by weight of the total weight of the first solution; and collecting the recrystallized plastics.

The present invention is a chemical waste plastic recycling method using a chemical reaction of waste plastics instead of recycling by physically changing waste plastics as in the mechanical plastic recycling method.

Specifically, the present invention has an advantage in that the purity of plastics is higher than those by chemical plastic recycling methods in the related art and colorless recycled plastics can be obtained by applying an adsorption purification method using an adsorbent and the recrystallization of plastics. The colorless recycled plastic means a recycled plastic that does not include a pigment or a dye. More specifically, "colorless" recycled plastics will be specifically illustrated by the measured values of a spectrophotometer to be described below.

More specifically, the recycling process of waste plastics according to the present invention may obtain a plastic with a significantly improved purity by adding an adsorbent to the first solution to perform a primary adsorption purification process, and adding a compound having a Hansen solubility parameter of 5 to 14 with respect to polycarbonate in an amount of 60 parts by weight or more based on 100 parts by weight of the total weight of the first solution to subject the plastic to recrystallization.

In this case, when the compound having a Hansen solubility parameter (HSP) of 5 to 14 with respect to polycarbonate is included in the above-described range based on 100 parts by weight of the total weight of the first solution, an additive such as an antioxidant or heat stabilizer may be effectively removed from the waste plastics, and recrystallized plastics may be obtained at a high yield, and when the compound is included in an amount of less than 60 parts by weight, recrystallization cannot be performed, or impurities may be contained in a large amount in the recrystallized plastics along with a low yield.

Furthermore, the recycling process of waste plastics according to the present invention may recycle pure polycarbonate by diversifying the type of adsorbent in the adsorption step and adjusting the ratio of each type to set optimal adsorption conditions, thereby removing impurities or other stabilizers, colorants, and the like which waste plastics have while maintaining inherent properties of existing polycarbonates.

In an exemplary embodiment of the present invention, the plastic is a general term for organic polymer materials that are plastic and can be softened by heating and molded into any shape.

The plastic may be, for example, polycarbonate (PC), polyethylene (PE), polypropylene (PP), polyvinyl chloride (PVC), polystyrene (PS) or polyethylene terephthalate (PET), but is not limited thereto.

In an exemplary embodiment of the present invention, the waste plastic means waste generated after using plastic, and the waste may be any industrial, commercial or household waste, but is not limited to any examples.

In an exemplary embodiment of the present invention, the waste plastic may be waste polycarbonate.

In the present specification, the plastics recycled by the recycling process of waste plastics are referred to as "recyclable plastics" or "recycled plastics".

In an exemplary embodiment of the present invention, the waste polycarbonate may have a weight average molecular weight of 40,000 g/mol to 60,000 g/mol. The weight average molecular weight (Mw) may be measured using gel permeation chromatography. Specifically, the weight average molecular weight may be measured at a column of PLgel Mixed B x 2, a solvent of tetrahydrofuran (THF), a flow rate of 1.0 mL/min, and a temperature of 40° C. using a THF-GPC instrument.

In an exemplary embodiment of the present invention, the waste polycarbonate may have a polydispersity index (PDI) of 1.7 to 3. Specifically, the waste polycarbonate may have a polydispersity index of 1.8 to 3.

In an exemplary embodiment of the present invention, the waste polycarbonate may have a melt flow rate (MFR) of 6 to 30. Specifically, the waste polycarbonate may have a melt flow rate (MFR) of 10 to 28.

The melt flow rate was measured using a weight of 1.2 kg at 300° C. using a device manufactured by Toyoseki MFR in accordance with ASTM D1238-94A/ISO 1133 method.

When the waste polycarbonate of the present invention satisfies at least one of the above-described weight average molecular weight, polydispersity index and melt flow rate, the waste polycarbonate of the present invention is a waste plastic which may be appropriately adopted in the recycling process of waste plastic according to the present invention.

In an exemplary embodiment of the present invention, the recrystallized plastic is polycarbonate.

The polycarbonate means a polymer including a carbonate bond, that is, a carbonate ester bond in the main chain.

In an exemplary embodiment of the present invention, the organic solvent is a cyclic ether-based solvent, a linear or cyclic carbonate-based solvent, or a hydrocarbon solvent having 1 to 8 carbon atoms, which includes one or more halogens.

In an exemplary embodiment of the present specification, the cyclic ether-based solvent may be tetrahydrofuran.

In an exemplary embodiment of the present invention, the linear carbonate-based solvent may be dimethyl carbonate (DMC), diethyl carbonate (DEC), dipropyl carbonate (DPC), ethylpropyl carbonate (EPC), ethylmethyl carbonate (EMC) or methylpropyl carbonate (MPC), but is not limited thereto.

In an exemplary embodiment of the present invention, the cyclic carbonate-based solvent may be ethylene carbonate (EC), propylene carbonate (PC), 1,2-butylene carbonate (BC), 2,3-butylene carbonate, 1,2-pentylene carbonate, 2,3-pentylene carbonate, vinylene carbonate (VC), vinyl ethylene carbonate or fluoroethylene carbonate, but is not limited thereto. Preferably, the cyclic carbonate-based solvent may be propylene carbonate.

In an exemplary embodiment of the present invention, the hydrocarbon solvent having 1 to 8 carbon atoms, which includes one or more halogens, may be methylene chloride or ethylene chloride, but is not limited thereto.

In an exemplary embodiment of the present invention, the organic solvent is preferably one or more selected from the group consisting of tetrahydrofuran, propylene carbonate, methylene carbonate and ethylene chloride.

In an exemplary embodiment of the present invention, the organic solvent is tetrahydrofuran.

In an exemplary embodiment of the present invention, the organic solvent is propylene carbonate.

In an exemplary embodiment of the present invention, the organic solvent is methylene carbonate.

In an exemplary embodiment of the present invention, the organic solvent is ethylene chloride.

In an exemplary embodiment of the present invention, the organic solvent is methylene chloride.

In an exemplary embodiment of the present invention, the waste plastic is included in an amount of 10 parts by weight to 20 parts by weight, and the organic solvent is included in an amount of 80 parts by weight to 90 parts by weight, based on 100 parts by weight of the total weight of the first solution.

Specifically, the waste plastic is included in an amount of 13 parts by weight to 20 parts by weight, and the organic solvent is included in an amount of 83 parts by weight to 90 parts by weight, based on 100 parts by weight of the total weight of the first solution.

More specifically, the waste plastic is included in an amount of 14 parts by weight to 16 parts by weight, and the organic solvent is included in an amount of 84 parts by weight to 86 parts by weight, based on 100 parts by weight of the total weight of the first solution.

When the waste plastic and the organic solvent are included in the first solution within the above-described range, the waste plastic is not precipitated, and the first solution may be appropriately prepared.

In an exemplary embodiment of the present invention, in the preparing of the first solution by dissolving the waste plastic in the organic solvent, the waste plastic is dissolved in the organic solvent for 1 hour to 3 hours.

Specifically, the waste plastic is dissolved in the organic solvent for 1 hour and 30 minutes to 2 hours and 30 minutes, preferably 2 hours.

When the waste plastic is dissolved in an organic solvent for 1 hour to 3 hours as described above, the waste plastic swells on the surface of the organic solvent, and thus, is not dissolved on the surface, but is well dissolved in the organic solvent, so that the first solution may be appropriately prepared.

In an exemplary embodiment of the present invention, the preparing of the first solution by dissolving the waste plastic in the organic solvent may be performed at room temperature. Specifically, the preparing of the first solution by dissolving the waste polycarbonate in the organic solvent may be performed at a temperature of 15° C. to 25° C. When the waste plastic is dissolved in the organic solvent at a temperature of 15° C. to 25° C. as described above, the degree of vaporization of the organic solvent is low, so that the desired first solution may be prepared without significantly changing the concentration of the solution.

In an exemplary embodiment of the present invention, after the preparing of the first solution, filtering the dissolved first solution is further included.

The filtering of the dissolved first solution filters other insoluble impurities, other polymers, and the like, which are accompanied by using insoluble additives and waste plastics included in the first solution for various purposes using a filter including a network structure having a maximum diameter of 0.45 μm or more and 1 μm or less.

The filter can be adopted without limitation as long as the filter satisfies the above-described range of maximum diameter and is not dissolved in the organic solvent.

For example, the filter may be polytetrafluoroethylene (PTFE) having a maximum diameter of 0.45 μm, manufactured by STERLITECH.

When the filter satisfies a maximum diameter within the above-described range, it is possible to effectively filter other insoluble impurities, other polymers, and the like, which are accompanied by using insoluble additives and waste plastics in the dissolved first solution for various purposes.

In the present invention, after the filtering of the dissolved first solution, an adsorbent is added as described below.

Since additives may remain in the first solution that has been subjected to the above-described filtering of the dissolved first solution, it is possible to recycle waste plastics into high-purity plastics by performing an adsorption purification process using an adsorbent.

The additives mean organic and inorganic dyes or pigments, heat stabilizers, antioxidants, UV stabilizers, flame retardants, antistatic agents, impact modifiers, plasticizers, glidants, or the like other than polymer compounds added during the preparation of a plastic, and are not limited thereto, and may mean all additives for preparing a plastic used in the art.

The antioxidant may be, for example, an Irgafos antioxidant, and the heat stabilizer may be, for example, a Tinuvin heat stabilizer.

In an exemplary embodiment of the present invention, the adding of the adsorbent to the first solution may be adding an adsorbent to the first solution to stir the resulting mixture for 1 to 3 hours. Specifically, the mixture is stirred for 1 hour and 30 minutes to 2 hours and 30 minutes, preferably 2 hours.

In an exemplary embodiment of the present invention, the adding of the adsorbent to the first solution to stir the resulting mixture for 1 to 3 hours may be performed at room temperature. Specifically, the adding of the adsorbent to the first solution to stir the resulting mixture for 1 to 3 hours may be performed at a temperature of 15° C. to 25° C. When the solution is stirred at a temperature of 15° C. to 25° C. as described above, the degree of vaporization of the organic solvent is low, so that the concentration of the solution may not be significantly changed.

In an exemplary embodiment of the present invention, after the adding of the adsorbent to the first solution, removing the adsorbent is further included.

The removing of the adsorbent is to remove the adsorbent using a filter including a network structure having a maximum diameter of 0.45 μm or more and 1 μm or less.

The filter can be adopted without limitation as long as the filter satisfies the above-described range of maximum diameter and is not dissolved in the organic solvent. For example, the filter may be polytetrafluoroethylene (PTFE) having a maximum diameter of 0.45 μm, manufactured by STERLITECH.

When the filter satisfies a maximum diameter within the above-described range, the adsorbent may be effectively removed.

The network structure means a skeleton structure which forms a filter.

The shape of the network structure is not particularly limited, and can be adopted without limitation as long as the maximum diameter is satisfied.

The maximum diameter means the longest line segment among line segments connecting two points on the perimeter of a figure with a straight line passing through the center of the figure forming each of the network structures. The center of the figure may mean the center of gravity.

As the removing of the adsorbent is performed, the additive remaining in the waste plastic included in the first solution may be primarily removed, and accordingly, the purity of the recycled plastic may be further increased.

In an exemplary embodiment of the present invention, the adsorbent is activated carbon; activated carbon pretreated with hydrochloric acid, sulfuric acid or phosphoric acid; acid clay; diatomaceous earth; zeolite; silica gel; alumina; magnesium silicate ($MgO_3Si$) or an ion exchange resin, or a combination thereof.

When the adsorbent is an adsorbent pretreated with an acid solution, the adsorbent may be modified to be polar and adsorb additives, and even when the adsorbent includes a substituent such as be a hydroxyl group (—OH) or a carboxylic acid group (—COOH), it is possible to adsorb the substituent having the polarity of the additive.

In an exemplary embodiment of the present invention, the adsorbent may be activated carbon. The activated carbon may be an activated charcoal powder (Cas no. 7440-44-0) from DUKSAN Science, but is not limited thereto.

In an exemplary embodiment of the present invention, the activated carbon may be activated carbon pretreated with hydrochloric acid, sulfuric acid or phosphoric acid.

The pretreatment means that the activated carbon is brought into contact with an acid solution including hydrochloric acid, sulfuric acid or phosphoric acid, and then washed with distilled water to modify the surface of the activated carbon. The method of bringing the activated carbon into contact with the acid solution may be performed by immersing the activated carbon in the acid solution or allowing the acid solution to flow through the activated carbon. Specifically, the activated carbon pretreated with hydrochloric acid, sulfuric acid or phosphoric acid may be C4386 pretreated with hydrochloric acid or C5510 pretreated with sulfuric acid and phosphoric acid, which were purchased from Sigma-Aldrich.

In an exemplary embodiment of the present invention, the activated carbon has a particle size of 100 mesh or less. Specifically, the activated carbon may have a particle size of 4 mesh or more and 100 mesh or less. More specifically, the activated carbon may have a particle size of 4 mesh or more and 12 mesh or less, 12 mesh or more and 20 mesh or less or 20 mesh or more and 40 mesh or less. When the activated carbon satisfies the above-described particle size, it is possible to effectively adsorb additives. The activated carbon having a particle size of 100 mesh or less may be purchased from Sigma-Aldrich or DAEJUNG Chemicals & Metals.

In an exemplary embodiment of the present invention, the adsorbent may be acid clay. The acid clay may be Cas no. 68333-91-5 from DUKSAN COMPANY, but is not limited thereto.

In an exemplary embodiment of the present invention, the adsorbent may be diatomaceous earth. The diatomaceous earth may be Celite®545 Cas no. 68855-54-9 from Sigma-Aldrich, but is not limited thereto.

In an exemplary embodiment of the present invention, the adsorbent may be zeolite. The zeolite may be CBV 5524G Cas no. 1318-02-1 from Zeolyst, but is not limited thereto.

In an exemplary embodiment of the present invention, the adsorbent may be silica gel. The silica gel may be silica gel 60 Cas no. 7631-86-9 from Merck, but is not limited thereto.

In an exemplary embodiment of the present invention, the adsorbent may be alumina. The alumina may be aluminum oxide, basic powder Cas no. 1344-28-1 from Baker, but is not limited thereto.

In an exemplary embodiment of the present invention, the adsorbent may be magnesium silicate ($MgO_3Si$, Florisil). The magnesium silicate may be Florisil® Cas no. 1343-88-0 from Sigma-Aldrich, but is not limited thereto.

In an exemplary embodiment of the present invention, the adsorbent may be an ion exchange resin. The ion exchange resin may be Amberlite IRC120H, Cas no. 39389-20-3 from Sigma-Aldrich, but is not limited thereto.

In an exemplary embodiment of the present invention, the adsorbent may be a combination of two or more selected from the group consisting of activated carbon; activated carbon pretreated with hydrochloric acid, sulfuric acid or phosphoric acid; acid clay; diatomaceous earth; zeolite; silica gel; alumina; magnesium silicate ($MgO_3Si$) and an ion exchange resin.

In an exemplary embodiment of the present invention, the adsorbent may be a combination of two or more selected from the group consisting of activated carbon; acid clay; silica gel; alumina and magnesium silicate ($MgO_3Si$).

In an exemplary embodiment of the present invention, the adsorbent may be a combination of three or more selected from the group consisting of activated carbon; acid clay; silica gel; alumina and magnesium silicate ($MgO_3Si$).

In an exemplary embodiment of the present invention, the adsorbent may include activated carbon; acid clay and magnesium silicate ($MgO_3Si$).

When two or more materials are included in the adsorbent, each material may be physically mixed and used.

In an exemplary embodiment of the present invention, the adsorbent may be composed of activated carbon; acid clay and magnesium silicate ($MgO_3Si$).

When the adsorbent includes activated carbon, acid clay and magnesium silicate ($MgO_3Si$), impurities except for plastics dissolved in the filtered first solution may be removed through adsorption by the activated carbon and the acid clay, and the oxidized parts of the plastics may be selectively removed by magnesium silicate ($MgO_3Si$).

In an exemplary embodiment of the present invention, the adsorbent may be included in an amount of 0.5 parts by weight or more and 8 parts by weight or less based on 100 parts by weight of the total weight of the first solution.

Specifically, the adsorbent may be included in an amount of 0.5 parts by weight or more and 7 parts by weight or less based on 100 parts by weight of the total weight of the first solution.

More specifically, the adsorbent may be included in an amount of 0.5 parts by weight or more and 6 parts by weight or less based on 100 parts by weight of the total weight of the first solution.

When the adsorbent is included in the first solution within the above-described range, impurities remaining in the first solution may be effectively removed, and simultaneously, processability may be maintained.

In an exemplary embodiment of the present invention, the adsorbent is activated carbon, and may be included in an amount of 0.5 parts by weight or more and 8 parts by weight or less based on 100 parts by weight of the total weight of the first solution.

In an exemplary embodiment of the present invention, the adsorbent is activated carbon, and may be included in an amount of 0.5 parts by weight or more and 6 parts by weight or less based on 100 parts by weight of the total weight of the first solution.

In an exemplary embodiment of the present invention, the adsorbent is activated carbon, and may be included in an amount of 1 part by weight or more and 5 parts by weight or less based on 100 parts by weight of the total weight of the first solution.

In an exemplary embodiment of the present invention, the adsorbent is activated carbon, and may be included in an amount of 1 part by weight or more and 4 parts by weight or less based on 100 parts by weight of the total weight of the first solution.

In an exemplary embodiment of the present invention, the adsorbent is acid clay, and may be included in an amount of 0.5 parts by weight or more and 8 parts by weight or less based on 100 parts by weight of the total weight of the first solution.

In an exemplary embodiment of the present invention, the adsorbent is acid clay, and may be included in an amount of 0.5 parts by weight or more and 6 parts by weight or less based on 100 parts by weight of the total weight of the first solution.

In an exemplary embodiment of the present invention, the adsorbent is acid clay, and may be included in an amount of 1 part by weight or more and 5 parts by weight or less based on 100 parts by weight of the total weight of the first solution.

In an exemplary embodiment of the present invention, the adsorbent is acid clay, and may be included in an amount of 1 part by weight or more and 4 parts by weight or less based on 100 parts by weight of the total weight of the first solution.

In an exemplary embodiment of the present invention, the adsorbent is acid clay, and may be included in an amount of 1 part by weight or more and 3 parts by weight or less based on 100 parts by weight of the total weight of the first solution.

In an exemplary embodiment of the present invention, the adsorbent is diatomaceous earth, and may be included in an amount of 0.5 parts by weight or more and 8 parts by weight or less based on 100 parts by weight of the total weight of the first solution.

In an exemplary embodiment of the present invention, the adsorbent is diatomaceous earth, and may be included in an amount of 0.5 parts by weight or more and 6 parts by weight or less based on 100 parts by weight of the total weight of the first solution.

In an exemplary embodiment of the present invention, the adsorbent is diatomaceous earth, and may be included in an amount of 1 part by weight or more and 5 parts by weight or less based on 100 parts by weight of the total weight of the first solution.

In an exemplary embodiment of the present invention, the adsorbent is diatomaceous earth, and may be included in an amount of 1 part by weight or more and 4 parts by weight or less based on 100 parts by weight of the total weight of the first solution.

In an exemplary embodiment of the present invention, the adsorbent is zeolite, and may be included in an amount of 0.5 parts by weight or more and 8 parts by weight or less based on 100 parts by weight of the total weight of the first solution.

In an exemplary embodiment of the present invention, the adsorbent is zeolite, and may be included in an amount of 0.5 parts by weight or more and 6 parts by weight or less based on 100 parts by weight of the total weight of the first solution.

In an exemplary embodiment of the present invention, the adsorbent is zeolite, and may be included in an amount of 1 part by weight or more and 5 parts by weight or less based on 100 parts by weight of the total weight of the first solution.

In an exemplary embodiment of the present invention, the adsorbent is zeolite, and may be included in an amount of 1 part by weight or more and 4 parts by weight or less based on 100 parts by weight of the total weight of the first solution.

In an exemplary embodiment of the present invention, the adsorbent is silica gel, and may be included in an amount of 0.5 parts by weight or more and 8 parts by weight or less based on 100 parts by weight of the total weight of the first solution.

In an exemplary embodiment of the present invention, the adsorbent is silica gel, and may be included in an amount of 0.5 parts by weight or more and 6 parts by weight or less based on 100 parts by weight of the total weight of the first solution.

In an exemplary embodiment of the present invention, the adsorbent is silica gel, and may be included in an amount of 1 part by weight or more and 5 parts by weight or less based on 100 parts by weight of the total weight of the first solution.

In an exemplary embodiment of the present invention, the adsorbent is silica gel, and may be included in an amount of 1 part by weight or more and 4 parts by weight or less based on 100 parts by weight of the total weight of the first solution.

In an exemplary embodiment of the present invention, the adsorbent is alumina, and may be included in an amount of 0.5 parts by weight or more and 8 parts by weight or less based on 100 parts by weight of the total weight of the first solution.

In an exemplary embodiment of the present invention, the adsorbent is alumina, and may be included in an amount of 0.5 parts by weight or more and 6 parts by weight or less based on 100 parts by weight of the total weight of the first solution.

In an exemplary embodiment of the present invention, the adsorbent is alumina, and may be included in an amount of 1 part by weight or more and 5 parts by weight or less based on 100 parts by weight of the total weight of the first solution.

In an exemplary embodiment of the present invention, the adsorbent is alumina, and may be included in an amount of 1 part by weight or more and 4 parts by weight or less based on 100 parts by weight of the total weight of the first solution.

In an exemplary embodiment of the present invention, the adsorbent is alumina, and may be included in an amount of 2 parts by weight or more and 4 parts by weight or less based on 100 parts by weight of the total weight of the first solution.

In an exemplary embodiment of the present invention, the adsorbent is magnesium silicate ($MgO_3Si$), and may be included in an amount of 0.5 parts by weight or more and 8 parts by weight or less based on 100 parts by weight of the total weight of the first solution.

In an exemplary embodiment of the present invention, the adsorbent is magnesium silicate ($MgO_3Si$), and may be included in an amount of 0.5 parts by weight or more and 6 parts by weight or less based on 100 parts by weight of the total weight of the first solution.

In an exemplary embodiment of the present invention, the adsorbent is magnesium silicate ($MgO_3Si$), and may be included in an amount of 1 part by weight or more and 5 parts by weight or less based on 100 parts by weight of the total weight of the first solution.

In an exemplary embodiment of the present invention, the adsorbent is magnesium silicate ($MgO_3Si$), and may be included in an amount of 1 part by weight or more and 4 parts by weight or less based on 100 parts by weight of the total weight of the first solution.

In an exemplary embodiment of the present invention, the adsorbent is magnesium silicate ($MgO_3Si$), and may be included in an amount of 0.5 parts by weight or more and 2 parts by weight or less based on 100 parts by weight of the total weight of the first solution.

In an exemplary embodiment of the present invention, the adsorbent is an ion exchange resin, and may be included in an amount of 0.5 parts by weight or more and 8 parts by weight or less based on 100 parts by weight of the total weight of the first solution.

In an exemplary embodiment of the present invention, the adsorbent is an ion exchange resin, and may be included in an amount of 0.5 parts by weight or more and 6 parts by weight or less based on 100 parts by weight of the total weight of the first solution.

In an exemplary embodiment of the present invention, the adsorbent is an ion exchange resin, and may be included in an amount of 1 part by weight or more and 5 parts by weight or less based on 100 parts by weight of the total weight of the first solution.

In an exemplary embodiment of the present invention, the adsorbent is an ion exchange resin, and may be included in an amount of 1 part by weight or more and 4 parts by weight or less based on 100 parts by weight of the total weight of the first solution.

In an exemplary embodiment of the present invention, the adsorbent may include 0.5 parts by weight to 3 parts by weight of the activated carbon, 0.5 parts by weight to 4 parts by weight of the acid clay, and 0.5 parts by weight to 2 parts by weight of the magnesium silicate ($MgO_3Si$), based on 100 parts by weight of the total weight of the first solution.

In an exemplary embodiment of the present invention, the adsorbent may include 1 part by weight to 3 parts by weight of the activated carbon, 1 part by weight to 4 parts by weight of the acid clay, and 0.5 parts by weight to 1 part by weight of the magnesium silicate ($MgO_3Si$), based on 100 parts by weight of the total weight of the first solution.

In an exemplary embodiment of the present invention, the adsorbent may include 1 part by weight to 2 parts by weight of the activated carbon, 1 part by weight to 3 parts by weight of the acid clay, and 0.5 parts by weight to 1 part by weight of the magnesium silicate ($MgO_3Si$), based on 100 parts by weight of the total weight of the first solution.

In an exemplary embodiment of the present invention, the adsorbent may include 2 parts by weight of the activated carbon, 3 parts by weight of the acid clay, and 1 part by weight of the magnesium silicate ($MgO_3Si$), based on 100 parts by weight of the total weight of the first solution.

In an exemplary embodiment of the present invention, the adsorbent may include 1.5 parts by weight of the activated carbon, 2 parts by weight of the acid clay, and 0.5 parts by weight of the magnesium silicate ($MgO_3Si$), based on 100 parts by weight of the total weight of the first solution.

In an exemplary embodiment of the present invention, the adsorbent may include 1 part by weight of the activated carbon, 1 part by weight of the acid clay, and 0.5 parts by weight of the magnesium silicate ($MgO_3Si$), based on 100 parts by weight of the total weight of the first solution.

After the removing of the adsorbent, a compound having a Hansen solubility parameter of 5 to 14 with respect to polycarbonate is added to the first solution based on 100 parts by weight of the total weight of the first solution to secondarily remove additives contained in the first solution, and polycarbonate is solidified.

That is, the additives are primarily removed by the above-described adsorbent, a compound having a Hansen solubility parameter (HSP) of 5 to 14 with respect to polycarbonate is added to secondarily remove the additives, so that waste plastics may be recycled into high-purity plastics.

In an exemplary embodiment of the present invention, a compound having a Hansen solubility parameter (HSP) of 5 to 14 with respect to polycarbonate may be added to the first solution in an amount of 60 parts by weight to 100 parts by weight based on 100 parts by weight of the total weight of the first solution.

When the compound having a Hansen solubility parameter (HSP) of 5 to 14 with respect to polycarbonate is included in an amount of more than 100 parts by weight, it is possible to expect a yield similar to that when the compound is included in an amount of 60 parts by weight to 100 parts by weight, but the content range may adversely act on the economic feasibility and processability because the effect is insignificant and many solvents are used.

That is, adding a compound having a Hansen solubility parameter (HSP) of 5 to 14 with respect to polycarbonate in an amount of 60 parts by weight to 100 parts by weight may be performed under optimum addition conditions capable of exhibiting an excellent effect in consideration of economic feasibility.

In an exemplary embodiment of the present invention, a compound having a Hansen solubility parameter (HSP) of 5 to 14 with respect to polycarbonate may be added to the first solution in an amount of 70 parts by weight to 90 parts by weight based on 100 parts by weight of the total weight of the first solution.

In an exemplary embodiment of the present invention, a compound having a Hansen solubility parameter (HSP) of 5 to 14 with respect to polycarbonate may be added to the first solution in an amount of 80 parts by weight to 90 parts by weight based on 100 parts by weight of the total weight of the first solution.

In an exemplary embodiment of the present invention, a compound having a Hansen solubility parameter (HSP) of 5 to 14 with respect to polycarbonate may be added to the first solution in an amount of 83 parts by weight to 87 parts by weight based on 100 parts by weight of the total weight of the first solution.

In an exemplary embodiment of the present invention, a compound having a Hansen solubility parameter (HSP) of 5 to 14 with respect to polycarbonate may be added to the first solution in an amount of 85 parts by weight based on 100 parts by weight of the total weight of the first solution.

In an exemplary embodiment of the present invention, the compound having a Hansen solubility parameter (HSP) of 5 to 14 with respect to the polycarbonate is a hydrocarbon compound including one or more selected from the group consisting of an alcohol, ketone, ether, a cycloalkane, ester, carboxylic acid and a nitrile group.

The Hansen solubility parameter with respect to the polycarbonate may be specifically calculated from non-polar dispersion force, dipole-dipole force due to permanent dipole, and hydrogen bonding force, in consideration of the degree of intra-material bonding of the polycarbonate.

Specifically, the compound having a Hansen solubility parameter (HSP) of 5 to 14 with respect to the polycarbonate is a hydrocarbon compound having 1 to 10 carbon atoms, which includes one or more selected from the group consisting of an alcohol, ketone, ether, a cycloalkane, ester, carboxylic acid and a nitrile group.

More specifically, the compound having a Hansen solubility parameter (HSP) of 5 to 14 with respect to the polycarbonate is a hydrocarbon compound having 1 to 5 carbon atoms, which includes one or more selected from the group consisting of an alcohol, ketone, ester and a nitrile group.

Preferably, the compound having a Hansen solubility parameter (HSP) of 5 to 14 with respect to the polycarbonate is ethanol, acetone, ethyl acetate or acetonitrile.

In an exemplary embodiment of the present invention, the compound having a Hansen solubility parameter (HSP) of 5 to 14 with respect to the polycarbonate is ethanol.

In an exemplary embodiment of the present invention, the compound having a Hansen solubility parameter (HSP) of 5 to 14 with respect to the polycarbonate is acetone.

In an exemplary embodiment of the present invention, the compound having a Hansen solubility parameter (HSP) of 5 to 14 with respect to the polycarbonate is ethyl acetate.

In an exemplary embodiment of the present invention, the compound having a Hansen solubility parameter (HSP) of 5 to 14 with respect to the polycarbonate is acetonitrile.

In an exemplary embodiment of the present invention, the weight percentage of waste plastics relative to the total weight of the first solution is 20 wt % or less, and the weight percentage of the recrystallized plastics relative to the total weight of the first solution is 20 wt % or less.

In an exemplary embodiment of the present invention, the weight percentage of waste plastics relative to the total weight of the first solution is 15 wt % or less, and the weight percentage of the recrystallized plastics relative to the total weight of the first solution is 15 wt % or less.

The weight percentage of waste plastics relative to the total weight of the first solution may be 1 wt % or more.

When the percent concentration of the first solution satisfies the above-described range, the waste plastics or recrystallized plastics may be sufficiently dissolved in the solvent to appropriately maintain the saturation state.

After the adding of the compound having a Hansen solubility parameter (HSP) of 5 to 14 with respect to the polycarbonate to the first solution, collecting the recrystallized polycarbonate is performed.

In an exemplary embodiment of the present invention, the collecting of the recrystallized polycarbonate may further include: precipitating a powder or granule type of plastic from the recrystallized polycarbonate; and obtaining recycled plastics by processing the precipitate. The precipitation and processing methods are not particularly limited, and methods applied in the art may be appropriately adopted.

Plastics recycled using the waste plastic recycling process of the present invention may be colorless because the plastics do not include additives such as organic and inorganic dyes or pigments.

In an exemplary embodiment of the present specification, based on the dL, da, db, and y values measured by a spectrophotometer using dichloromethane in a pure solvent state, the dL, da, db, and y values of a solution in which the plastics recycled by the recycling process of the waste plastics are dissolved in a solvent dichloromethane in an amount of 5 wt %, measured by a spectrophotometer satisfy the following relational expression.

$$|dL| < 0.35,\ |da| < 0.2,\ |db| < 0.3,\ y < 1.5 \qquad \text{Relational Expression}$$

The spectrophotometer may be an X-rite Ci7600 Color Spectrophotometer.

Specifically, the relational expression means a difference between reference values (0) and dL, da, and db values of the recycled plastics in which the dL, da, and db values of dichloromethane in a pure solvent state measured by a spectrophotometer are set as the reference values (0), and the dL, da, and db values of the recycled plastics are measured by a spectrophotometer. In the relational expression, y means a yellow index.

The dichloromethane in a pure solvent state means dichloromethane including no solute.

In the present specification, when the dL, da, db, and y values measured by the spectrophotometer satisfy the relational expression, it may mean that the measurement target (recycled plastic) is colorless, which does not exhibit a specific color.

An exemplary embodiment of the present specification provides a method for preparing recyclable plastics, the method including a recycling process of the waste plastics.

In the method for preparing recyclable plastics, in addition to the recycling process of the waste plastics, other processes necessary for preparing recyclable plastics may be additionally adopted, and processes known in the art may be adopted as the processes.

Mode for Invention

Hereinafter, the present invention will be exemplified in more detail through Examples. The present invention is not limited to these Examples, the Examples according to the present invention may be modified in various forms, and it should not be interpreted that the scope of the present invention is limited to the Examples to be described in detail below. The Examples of the present invention are provided for more completely explaining the present invention to a person with ordinary skill in the art.

Examples 1 to 30

15 parts by weight of waste polycarbonate was added to 85 parts by weight of the organic solvent shown in the following Table 1 at room temperature and dissolved for 2 hours to prepare 100 parts by weight of a first solution. As the waste polycarbonate, a waste polycarbonate having a weight average molecular weight of 40,000 g/mol to 60,000 g/mol, a polydispersity index (PDI) of 1.8 to 3, and a melt flow rate (MFR) of 10 to 28 was used.

After the dissolved first solution was filtered using a polytetrafluoroethylene (PTFE) filter including a network structure with a maximum diameter of 0.45 μm, manufactured by STERLITECH, activated carbon shown in the following Table 1 as an adsorbent was added thereto, and the resulting mixture was stirred for 2 hours.

The stirring was finished, the adsorbent was removed using the polytetrafluoroethylene (PTFE) filter including a network structure with a maximum diameter of 0.45 μm, manufactured by STERLITECH, and then a compound having a Hansen solubility parameter (HSP) of 5 to 14 with respect to polycarbonate in the following Table 1 was added thereto, and then recrystallized polycarbonate was collected.

Comparative Examples 1 to 6

Experiments were performed in the same manner as in the above-described Examples, except that the compound having a Hansen solubility parameter (HSP) of 5 to 14 with respect to the polycarbonate and the adsorbent were added in amounts of the parts by weight shown in the following Table 1.

TABLE 1

| Classification | Waste plastic Waste polycarbonate | Organic solvent | | | | Compound having Hansen solubility parameter (HSP) of 5 to 14 with respect to polycarbonate | | | | Adsorbent | | | | |
|---|---|---|---|---|---|---|---|---|---|---|---|---|---|---|
| | | Tetrahydrofuran | Propylene carbonate | Methylene chloride | Ethylene chloride | Ethanol | Acetone | Ethyl acetate | Acetonitrile | Activated carbon | Acid clay | Magnesium silicate | Silica gel | Alumina |
| Example | | | | | | | | | | | | | | |
| 1 | 15 | | | 85 | | | 85 | | | 1 | | | | |
| 2 | 15 | | | 85 | | | 85 | | | 2 | | | | |
| 3 | 15 | | | 85 | | | 85 | | | 3 | | | | |
| 4 | 15 | | | 85 | | | 85 | | | 4 | | | | |
| 5 | 15 | | | 85 | | | 85 | | | 1.5 | | | | |
| 6 | 15 | | | 85 | | | 85 | | | | 1 | | | |
| 7 | 15 | | | 85 | | | 85 | | | | 2 | | | |

TABLE 1-continued

| Classification | Waste plastic | Organic solvent | | | | Compound having Hansen solubility parameter (HSP) of 5 to 14 with respect to polycarbonate | | | | Adsorbent | | | | |
|---|---|---|---|---|---|---|---|---|---|---|---|---|---|---|
| | Waste polycarbonate | Tetrahydrofuran | Propylene carbonate | Methylene chloride | Ethylene chloride | Ethanol | Acetone | Ethyl acetate | Acetonitrile | Activated carbon | Acid clay | Magnesium silicate | Silica gel | Alumina |
| 8 | 15 | | | 85 | | | 85 | | | | 3 | | | |
| 9 | 15 | | | 85 | | | 85 | | | | | 1 | | |
| 10 | 15 | | | 85 | | | 85 | | | | | 2 | | |
| 11 | 15 | | | 85 | | | 85 | | | | | 0.5 | | |
| 12 | 15 | | | 85 | | | 85 | | | | | | 3 | |
| 13 | 15 | | | 85 | | | 85 | | | | | | | 3 |
| 14 | 15 | | | 85 | | | 85 | | | 2 | 3 | 1 | | |
| 15 | 15 | | | 85 | | | 85 | | | 1.5 | 2 | 0.5 | | |
| 16 | 15 | | | 85 | | | 85 | | | 1 | 1 | 0.5 | | |
| 17 | 15 | | | 85 | | 85 | | | | 2 | 3 | 1 | | |
| 18 | 15 | | | 85 | | | | 85 | | 2 | 3 | 1 | | |
| 19 | 15 | | | 85 | | | | | 85 | 2 | 3 | 1 | | |
| 20 | 15 | | | 85 | | 85 | | | | 2 | | | | |
| 21 | 15 | | | 85 | | | | 85 | | 2 | | | | |
| 22 | 15 | | | 85 | | | | | 85 | 2 | | | | |
| 23 | 15 | | | 85 | | | 60 | | | 2 | | | | |
| 24 | 15 | | | 85 | | | 70 | | | 2 | | | | |
| 25 | 15 | | | 85 | | | 90 | | | 2 | | | | |
| 26 | 15 | | | 85 | | | 100 | | | 2 | | | | |
| 27 | 15 | | | 85 | | | 110 | | | 2 | | | | |
| 28 | 15 | | | 85 | | | 120 | | | 2 | | | | |
| 29 | 15 | | | 85 | | | 85 | | | 0.3 | | | | |
| 30 | 15 | | | 85 | | | 85 | | | 9 | | | | |
| Comparative Example | | | | | | | | | | | | | | |
| 1 | 15 | | | 85 | | | 85 | | | | | | | |
| 2 | 15 | | | 85 | | | 10 | | | | | | | |
| 3 | 15 | | | 85 | | | 20 | | | | | | | |
| 4 | 15 | | | 85 | | | 30 | | | | | | | |
| 5 | 15 | | | 85 | | | 40 | | | 2 | | | | |
| 6 | 15 | | | 85 | | | 50 | | | 2 | | | | |

In Table 1, the applied adsorbents are specifically as follows.

Activated carbon: Activated charcoal powder (Cas no. 7440-44-0) from DUKSAN Science Acid clay: Cas no. 68333-91-5 from DUKSAN Company Magnesium silicate: Florisil® Cas no. 1343-88-0 from Sigma-Aldrich Silica gel: silica gel 60 Cas no. 7631-86-9 from Merck Alumina: Aluminum oxide, basic powder Cas no. 1344-28-1 from Baker

Experimental Example

After plastic was precipitated into a powder type from recrystallized plastic, the plastic was processed into pellets using an extruder to obtain recycled plastic.

The color of the recycled plastic was measured under the following conditions, and is shown in the following Table 2.

Spectrophotometric measurements of recycled plastic: After the dL, da, db, and y values measured by first putting dichloromethane in a pure solvent state into a measurement cuvette using a X-rite Ci7600 color spectrophotometer were set as the reference values (0), the difference between the reference values (0) and the dL, da, and db values measured by putting a solution of the recycled plastic dissolved in a solvent dichloromethane in an amount of 5 wt % into a measurement cuvette is shown.

TABLE 2

| | Spectrophotometric measurement | | | |
|---|---|---|---|---|
| | dL | da | db | y |
| Example 1 | −0.14D | −0.02G | −0.09B | 0.5 |
| Example 2 | −0.07D | −0.02G | −0.02B | 0.4 |
| Example 3 | −0.06D | −0.03G | −0.01B | 0.4 |
| Example 4 | −0.06D | −0.02G | −0.01B | 0.4 |
| Example 5 | −0.07D | −0.02G | 0.02B | 0.4 |
| Example 6 | −0.19D | −0.09G | −0.16B | 0.9 |
| Example 7 | −0.12D | −0.07G | −0.09B | 0.8 |
| Example 8 | −0.11D | −0.07G | −0.08B | 0.8 |
| Example 9 | −0.23D | −0.12G | −0.21B | 1.1 |
| Example 10 | −0.23D | −0.12G | −0.21B | 1.1 |
| Example 11 | −0.25D | −0.13G | −0.22B | 1.1 |
| Example 12 | −0.30D | −0.14G | −0.21B | 1.2 |
| Example 13 | −0.34D | −0.14G | −0.21B | 1.3 |
| Example 14 | −0.05D | −0.02G | 0.01B | 0.1 |
| Example 15 | −0.05D | −0.02G | 0.00 | 0.2 |
| Example 16 | −0.05D | −0.07 | 0.01 | 0.2 |
| Example 17 | −0.05D | −0.10G | −0.03B | 0.4 |
| Example 18 | −0.05D | −0.05 | −0.02B | 0.3 |
| Example 19 | −0.05D | −0.04G | −0.02B | 0.2 |
| Example 20 | −0.10D | −0.02G | −0.08B | 0.6 |
| Example 21 | −0.09D | −0.02G | −0.05B | 0.5 |
| Example 22 | −0.08D | −0.02G | −0.03B | 0.4 |
| Example 23 | −0.09D | −0.03G | −0.06B | 0.5 |
| Example 24 | −0.08D | −0.02G | −0.05B | 0.5 |
| Example 25 | −0.07D | −0.02G | −0.02B | 0.4 |
| Example 26 | −0.07D | −0.02G | −0.02B | 0.4 |
| Example 27 | −0.06D | −0.02G | −0.02B | 0.4 |
| Example 28 | −0.06D | −0.02G | −0.01B | 0.3 |
| Example 29 | −0.25D | −0.09G | −0.20B | 1.1 |

TABLE 2-continued

| | Spectrophotometric measurement | | | |
|---|---|---|---|---|
| | dL | da | db | y |
| Example 30 | −0.05D | −0.02G | −0.01B | 0.3 |
| Comparative Example 1 | −0.43D | −0.14G | −0.37B | 1.3 |
| Comparative Example 2 | Solid cannot be obtained | | | |
| Comparative Example 3 | Solid cannot be obtained | | | |
| Comparative Example 4 | Solid cannot be obtained | | | |
| Comparative Example 5 | −0.38D | −0.12G | −0.25B | 1.2 |
| Comparative Example 6 | −0.35D | −0.09G | −0.18B | 1.1 |

According to Table 2, in the case of Examples 1 to 30 according to the exemplary embodiments of the present invention, it could be confirmed that additives such as organic and inorganic dyes or pigments were removed without being included by confirming that the recycled plastic was colorless because the spectrophotometric measurement result values in Table 2 satisfied the relational expression.

Further, in the case of Examples 27 and 28 in which 110 parts by weight and 120 parts by weight of a compound having a Hansen solubility parameter (HSP) of 5 to 14 with respect to polycarbonate were used, it could be confirmed that spectrophotometric measurement results satisfied the relational expression, but the difference in effect was insignificant compared to the cases using 60 parts by weight to 100 parts by weight of the compound.

In addition, in the case of Comparative Example 1 in which no adsorbent was added, the recycled plastic was not colorless because the dL and db values did not satisfy the relational expressions, so it was confirmed that the additives or impurities were included in the recycled plastic.

Furthermore, in the case of Comparative Examples 2 to 4 in which 10 parts by weight, 20 parts by weight, and 30 parts by weight of a compound having a Hansen solubility parameter (HSP) of 5 to 14 with respect to polycarbonate were used, the amount of compound having a Hansen solubility parameter (HSP) of 5 to 14 with respect to the polycarbonate added was so small that a solid could not be obtained because the recrystallization of polycarbonate was not smooth.

Further, in the case of Comparative Examples 5 and 6 in which 40 parts by weight and 50 parts by weight of the compound having a Hansen solubility parameter (HSP) of 5 to 14 with respect to the polycarbonate were used, it was confirmed that the dL value did not satisfy the relational expression to indicate that the recycled plastic was not colorless, the yield at which the solid was obtained was about half that of Comparative Example 1 and thus was not suitable for the process, and additives or impurities were included in the recycled plastic.

Accordingly, it was confirmed that a recycled plastic having excellent purity can be obtained when the waste plastic recycling process according to the present invention is applied.

The invention claimed is:

1. A recycling process of a waste plastic, comprising:
preparing a first solution by dissolving a waste plastic in an organic solvent at a temperature ranging from 15° C. to 25° C.;
adding an adsorbent to the first solution;
recrystallizing a plastic by adding 60 parts by weight or more of a compound having a Hansen solubility parameter (HSP) of 5 to 14 with respect to polycarbonate based on 100 parts by weight of a total weight of the first solution; and
collecting the recrystallized plastic.

2. The recycling process of claim 1, further comprising, after the preparing of the first solution, performing a filtration.

3. The recycling process of claim 1, further comprising, after the adding of the adsorbent to the first solution, removing the adsorbent.

4. The recycling process of claim 1, wherein the recrystallized plastic is polycarbonate.

5. The recycling process of claim 1, wherein the organic solvent is a cyclic ether-based solvent, a linear or cyclic carbonate-based solvent, or a hydrocarbon solvent having 1 to 8 carbon atoms and one or more halogens.

6. The recycling process of claim 1, wherein the compound having a Hansen solubility parameter (HSP) of 5 to 14 with respect to polycarbonate is a hydrocarbon compound comprising one or more selected from an alcohol, a ketone, an ether, a cycloalkane, ester, a carboxylic acid or a nitrile group.

7. The recycling process of claim 1, wherein the adsorbent is activated carbon; activated carbon pretreated with hydrochloric acid, sulfuric acid or phosphoric acid; acid clay; diatomaceous earth; zeolite; silica gel; alumina; magnesium silicate ($MgO_3Si$) or an ion exchange resin, or a combination thereof.

8. The recycling process of claim 1, wherein the adsorbent comprises activated carbon, acid clay and magnesium silicate ($MgO_3Si$).

9. The recycling process of claim 1, wherein the adsorbent is added in an amount of 0.5 parts by weight or more and 8 parts by weight or less based on 100 parts by weight of the total weight of the first solution.

10. The recycling process of claim 8, wherein the adsorbent comprises, based on 100 parts by weight of the total weight of the first solution:
0.5 parts by weight to 3 parts by weight of the activated carbon,
0.5 parts by weight to 4 parts by weight of the acid clay, and
0.5 parts by weight to 2 parts by weight of the magnesium silicate ($MgO_3Si$).

11. The recycling process of claim 1, wherein the waste plastic is included in an amount of 10 parts by weight to 20 parts by weight, and the organic solvent is included in an amount of 80 parts by weight to 90 parts by weight, based on 100 parts by weight of the total weight of the first solution.

12. The recycling process of claim 1, wherein the compound having a Hansen solubility parameter (HSP) of 5 to 14 with respect to polycarbonate is included in an amount of 80 parts by weight to 90 parts by weight, based on 100 parts by weight of the total weight of the first solution.

13. The recycling process of claim 3, wherein the removing of the adsorbent is performed by using a filter comprising a network structure having a maximum diameter of 0.45 μm or more and 1 μm or less.

14. The recycling process of claim 1, wherein a weight percentage of waste plastics relative to the total weight of the first solution is 20 wt % or less, and a weight percentage of the recrystallized plastic relative to the total weight of the first solution is 20 wt % or less.

15. A method for preparing a recyclable plastic, the method comprising the recycling process of claim 1.

16. The recycling process of claim 1, wherein the organic solvent is one or more selected from tetrahydrofuran, propylene carbonate, methylene carbonate or ethylene chloride.

17. The recycling process of claim 1, wherein the compound having a Hansen solubility parameter (HSP) of 5 to 14 with respect to polycarbonate is ethanol, acetone, ethyl acetate or acetonitrile.

* * * * *